Figure 1:
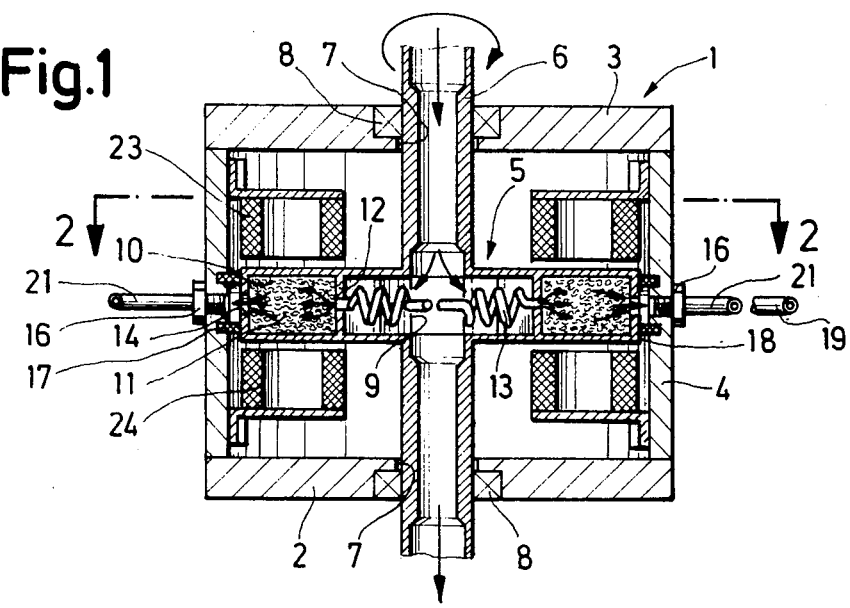

United States Patent [19]

Peschka et al.

[11] Patent Number: 4,727,721
[45] Date of Patent: Mar. 1, 1988

[54] APPARATUS FOR MAGNETOCALORIC REFRIGERATION

[75] Inventors: Walter Peschka, Sindelfingen; Gottfried Schneider, Stuttgart, both of Fed. Rep. of Germany

[73] Assignee: Deutsche Forschungs- und Versuchsanstalt fur Luft und Raumfahrt e.V., Bonn, Fed. Rep. of Germany

[21] Appl. No.: 927,260

[22] Filed: Nov. 4, 1986

[30] Foreign Application Priority Data

Nov. 8, 1985 [DE] Fed. Rep. of Germany ....... 3539584

[51] Int. Cl.$^4$ ............................................. F25B 21/02
[52] U.S. Cl. .................................................. 62/3
[58] Field of Search ............................................. 62/3

[56] References Cited

U.S. PATENT DOCUMENTS

| 4,033,734 | 7/1977 | Steyert, Jr. et al. | 62/3 |
| 4,107,935 | 8/1978 | Steyert, Jr. | 62/3 |
| 4,332,135 | 6/1982 | Barclay et al. | 62/3 |
| 4,459,811 | 7/1984 | Barclay et al. | 62/3 |
| 4,509,334 | 4/1985 | Nakagome et al. | 62/3 X |

*Primary Examiner*—Lloyd L. King
*Attorney, Agent, or Firm*—Wolf, Greenfield & Sacks

[57] ABSTRACT

An apparatus for magnetocaloric refrigeration, comprising a ferromagnetic material arranged in a rotor and alternately entering and exiting from a stationary magnetic field when the rotor rotates, and also comprising a circuit for a working gas coming into successive heat exchange contact with a ferromagnetic material arranged outside the magnetic field and thereby cooled, a refrigeration load, a ferromagnetic material located within the magnetic field and thereby heated as well as an external negative heat source. In order to avoid problems with seals in such an apparatus at low temperatures, it is suggested that discrete members consisting of ferromagnetic material be arranged around the rotor circumference so as to be angularly offset, that two members be connected each time to form a pair by a flow path for the working gas, this flow path being arranged within the rotor and leading from an outer surface of the rotor via heat contact with one member of the pair into the center of the rotor and then via heat contact with the other member of the pair to an outer surface of the rotor again, that at least one stationary supply conduit ending in a sealed manner at the outer surface of the rotor and one stationary outlet conduit beginning in a sealed manner at the outer surface of the rotor be provided for the working gas, both conduits communicating with the flow path of one pair in a predetermined angular position of the rotor, that each outlet conduit be associated with a stationary magnetic field such that the member adjacent the outlet conduit is located within this stationary magnetic field and the other member of the pair outside the magnetic field in the predetermined angular position of the rotor, and that a cooling conduit be guided through a hollow bearing shaft of the rotor and have a refrigeration medium flowing through it, this refrigeration medium acting as refrigeration load and coming into heat contact with the working gas in the center of the rotor.

8 Claims, 3 Drawing Figures

APPARATUS FOR MAGNETOCALORIC REFRIGERATION

The invention relates to an apparatus for magnetocaloric refrigeration, comprising a ferromagnetic material arranged in a rotor and alternately entering and exiting from a stationary magnetic field when the rotor rotates, and also comprising a circuit for a working gas coming into successive heat exchange contact with a ferromagnetic material arranged outside the magnetic field and thereby cooled, a refrigeration load, a ferromagnetic material located within the magnetic field and thereby heated as well as an external negative heat source.

It is known that ferromagnetic substances are cooled when they are withdrawn from a magnetic field. If this process is carried out in cycles, a continuous refrigeration may be obtained in this way when it is possible to supply the refrigeration capacity resulting during demagnetization to a refrigeration load and also to remove the heat resulting during subsequent magnetization of the ferromagnetic substance. In the practical embodiment of such arrangements an attempt is made to transfer the quantities of heat by means of working gases which flow in heat contact with the ferromagnetic substances. Quite considerable difficulties are encountered in this respect since the ferromagnetic substances have to be displaced so that they enter and are withdrawn again from the magnetic field. It is difficult or even impossible to manufacture reliable seals for low temperatures.

It is known, for example, to rotate a ring of ferromagnetic material such that one region is always in a stationary magnetic field while another, oppositely located region is not in a magnetic field. The ring consists of a porous ferromagnetic material, into which a working gas may be introduced. This gas may flow in the circumferential direction of the ring and then leave the ring again. The working gas is hereby guided in a circuit such that it is first introduced from an external negative heat source into the annular region of the ring not located in the magnetic field and cooled in this region. The gas then comes into heat exchange contact with the refrigeration load, exits in the region of the ring located in the magnetic field, hereby absorbing the heat resulting in this region, and finally supplies this heat to an external negative heat source (J.Appl.Phys. 49 (3), pages 1216 et seq., March 1978). Although this method appears to be operable in theory, in practice considerable difficulties have resulted due to the sealing problems encountered, particularly in the cold region.

The object of the invention is therefore to develop an apparatus of the type in question further such that difficulties with seals in the cold region can be avoided.

This object is accomplished in accordance with the invention, for an apparatus of the type described at the outset, in that discrete members consisting of ferromagnetic material are arranged around the rotor circumference so as to be angularly offset, that two members are connected each time to form a pair by a flow path for the working gas, this flow path being arranged within the rotor and leading from an outer surface of the rotor via heat contact with one member of the pair into the center of the rotor and then via heat contact with the other member of the pair to an outer surface of the rotor again, that at least one stationary supply conduit ending in a sealed manner at the outer surface of the rotor and one stationary outlet conduit beginning in a sealed manner at the outer surface of the rotor are provided for the working gas, both conduits communicating with the flow path of one pair in a predetermined angular position of the rotor, that each outlet conduit is associated with a stationary magnetic field such that the member adjacent the outlet conduit is located within this stationary magnetic field and the other member of the pair outside the magnetic field in the predetermined angular position of the rotor, and that a cooling conduit is guided through a hollow bearing shaft of the rotor and has a refrigeration medium flowing through it, this refrigeration medium acting as refrigeration load and coming into heat contact with the working gas in the center of the rotor.

With this arrangement, the entire circuit for the working gas on the cold side is conducted through the interior of the rotor and no parts which are movable against one another occur in this region. A seal is required only on the outer surface of the rotor, i.e. on the warm side of the working gas circuit. This means that no sealing problems caused by low temperatures will occur.

In a preferred embodiment of the invention, with one pair the beginning and end of the flow path form a circumferential angle of 360/2n degrees, wherein n is a whole number, that n supply conduits and n outlet conduits are uniformly distributed around the circumference, supply conduits and outlet conduits hereby alternating, and that each outlet conduit is associated with a stationary magnetic field and the member disposed upstream of the respective outlet conduit is located within said magnetic field.

Due to this construction, each magnetic member is subject to a plurality of magnetizations and demagnetizations during one revolution of the rotor and these are used by various working gas circuits, one after the other, for cooling the refrigeration medium flowing through the center of the rotor. This results in a quasi-continuous removal of heat from the refrigeration medium. The uniformity of heat removal may be increased by increasing n.

It is particularly favourable in this respect for a plurality of supply conduits and outlet conduits to be connected in parallel with one another and communicate with an external negative heat source. This results in a quasi-continuous operation on the external side.

This uniformity of operation may be improved in that the rotor has up to n pairs distributed around the circumference of the rotor such that the flow paths of all the pairs communicate simultaneously with supply and outlet conduits. For example, a total of four ferromagnetic members may be arranged in the rotor and offset relative to one another by an angle of 90° in the circumferential direction. Each magnet of each pair then passes into a magnetic field twice during one rotation of the rotor, i.e. each of the four magnets is magnetized twice and demagnetized twice during each rotation, and so cooled working gas comes into heat contact with the refrigeration medium a total of four times during each rotation.

It is advantageous for the members to consist of porous ferromagnetic material and to fill the cross section of the flow path so that the working gas passes through the porous ferromagnetic material.

In this respect it is possible for the members of ferromagnetic material to be arranged in rotor chambers, through which the flow path passes, and for a heat exchanger duct to be disposed between the chambers accommodating the two members, this heat exchanger duct connecting the chambers and leading through the hollow bearing shaft of the rotor.

This heat exchanger duct preferably has the shape of a helix.

In a preferred embodiment, the supply and outlet conduits are encircled by stationary seals abutting sealingly against the outer surface of the rotor. In this way, the supply and outlet conduits communicate each time with the flow paths of the individual pairs when the rotor is in predetermined angular positions. In the remaining angular positions of the rotor, the supply and outlet conduits are closed by the outer surface of the rotor.

Figure 2:
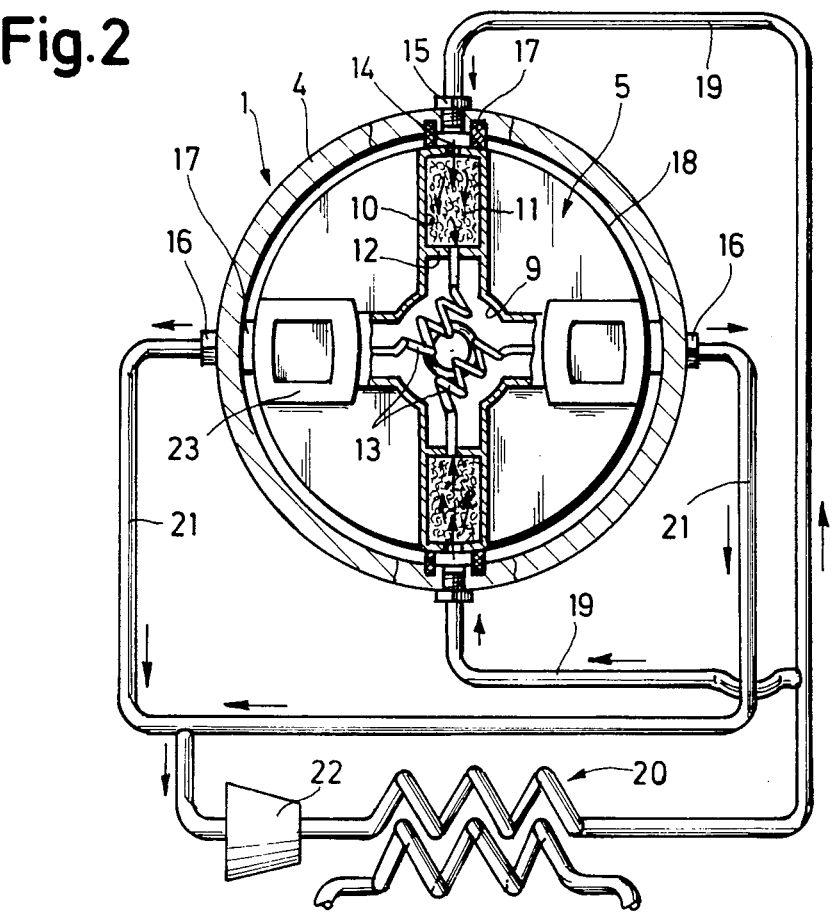
Figure 3:
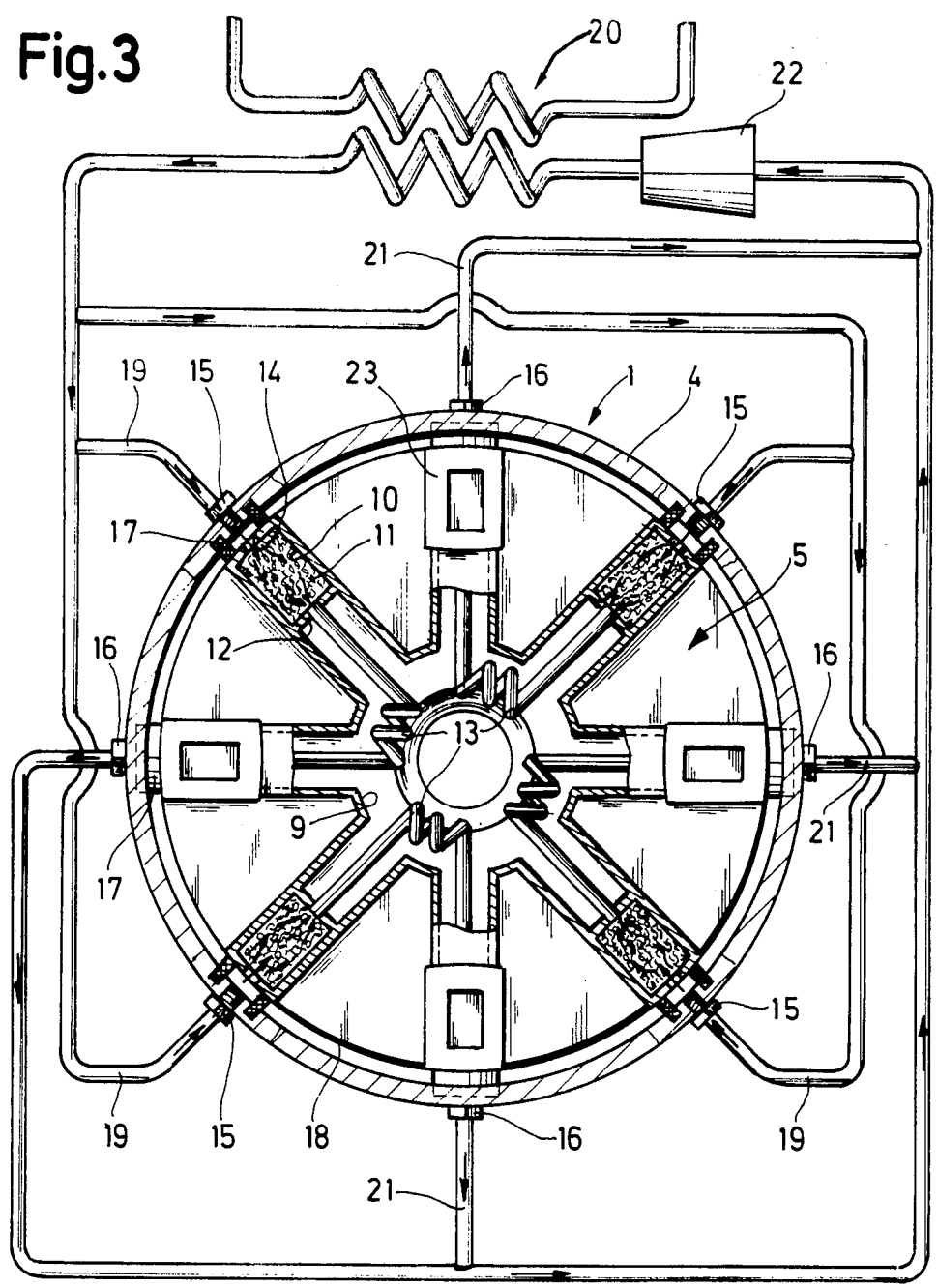

The following description of preferred embodiments of the invention serves to explain the invention in greater detail in conjunction with the drawings, in which FIG. 1 is a cross-sectional view of a magnetocaloric refrigeration apparatus comprising four ferromagnetic members;

FIG. 2 is a sectional view along line 2—2 in FIG. 1, illustrating in addition the circuit for the working gas, and FIG. 3 is a view similar to FIG. 2 of a rotor comprising eight members of ferromagnetic material distributed around the circumference.

A disc-shaped rotor 5 is rotatably mounted by a central hollow shaft 6 in a stator housing 1 comprising a bottom wall 2, a cover 3 and a circular-cylindrical side wall 4. The bottom wall 2 and cover 3 have central openings 7, in which suitable bearing rings 8 are held. The hollow shaft 6 communicates with a central interior space 9 in the disc-shaped rotor 5. In a manner not apparent from the drawings, the hollow shaft 6 communicates outside the stator housing 1, and in a sealed manner, with a gas supply and a gas exhaust means and so the hollow shaft 6 and the interior space 9 have a gas flowing through them which is designated in the following as refrigeration medium.

Located in the disc-shaped rotor 5, in the vicinity of its periphery, are four chambers 10 which are offset relative to one another through 90° and are filled with a member 11 consisting of a porous ferromagnetic material, for example a gadoliniumgallium garnet $Gd_3 Ga_5 O_{12}$.

Each chamber 10 is separated from the hollow interior space 9 of the rotor by a partition 12. Every two adjacent chambers 10 are connected with one another by a helical heat exchanger duct 13 which is disposed in the interior space 9 such that the refrigeration medium flowing through the hollow shaft 6 and the interior space 9 is in intimate heat contact with the heat exchanger ducts 13.

Each chamber 10 has an opening 14 which is directed radially outwards and leads to the periphery of the rotor 5.

Two diametrally opposed supply conduits 15 and two diametrally opposed outlet conduits 16 for a working gas are provided in the side wall 4 of the stator housing 1. These conduits are arranged on a level with the central plane of the rotor. The points at which the supply conduits 15 and the outlet conduits 16 pass through the side wall are each surrounded by an annular seal 17 held on the side wall 4. The front faces of the annular seals abut sealingly on the circumferential surface 18 of the rotor. Supply conduits and outlet conduits are at right angles to one another so that, when seen in the circumferential direction, a supply conduit and an outlet conduit are alternately disposed every 90°.

The supply conduits 15 communicate with the exit side of a heat exchanger 20 by means of a common branching conduit 19. The outlet conduits 16 communicate with the entry side to the heat exchanger 20 in the same manner, by means of two conduits 21 which are joined together. A circulating pump 22 or compressor is provided for conveying the working gas. In the heat exchanger 20, heat contact is provided with a negative heat source which is not illustrated in more detail in the drawings. This may be, for example, a magnetocaloric refrigeration stage operating at a higher temperature or any other refrigeration machine.

Two diametrally opposed coils 23 and 24 of a superconductive magnet are arranged above and below the rotor 5. In this respect, coils arranged above and below the rotor 5 together form a magnetic field penetrating the rotor in its circumferential region. The arrangement of the coils 23 and 24 is such that the chambers 10 with the ferromagnetic members 11 arranged therein enter the magnetic field when these chambers 10 are in flow connection with the outlet conduits 16 (FIG. 2).

During operation, the hollow shaft 6 has refrigeration medium continually flowing through it. When the rotor 5 is located in an angular position in which the openings 14 of the chambers 10 are aligned with the supply conduits 15 or the outlet conduits 16, respectively, working gas can flow into the non-magnetized chambers 10 via the supply conduits 15 and through the ferromagnetic material contained therein. As this material has been demagnetized due to withdrawal from a magnetic field, it has a low temperature and cools the working gas flowing through it. In the heat exchanger duct 13, the gas subsequently transfers refrigeration capacity to the refrigeration medium flowing through the hollow shaft 6 and the interior space 9 and reaches the adjacent chamber 10 after it has been correspondingly heated. This chamber is located in a magnetic field. The temperature of the ferromagnetic material is thus increased due to magnetization, the working gas flowing through this ferromagnetic material is heated as it flows therethrough and, in this way, conveys heat to the external heat exchanger 20 where this heat is removed from the working gas again. This circulation of the working gas takes place only when the rotor is in an angular position in which the openings 14 of the chambers are aligned with the supply conduits 15 and the outlet conduits 16. If the rotor rotates out of this position, the outlet conduits and supply conduits are first closed until the openings 14 of the chambers are again aligned with supply conduits and outlet conduits following a rotation through 90°. Due to this rotation, the chambers which were previously located in the magnetic field are now in the region without any magnetic field and vice versa. At the same time, the chambers which previously commuicated with supply conduits now communicate with outlet conduits and vice versa. When the working gas begins to circulate again, it is cooled in the same manner, refrigeration capacity is transferred to the refrigeration medium and heat is removed from the magnetized ferromagnetic material and transferred in the external heat exchanger 20. In this respect, the ferromagnetic materials in the two chambers 10 connected via the heat exchanger duct 13 have exchanged roles in comparison with the previous position. Following a further rotation through 90° the roles are again exchanged. The two chambers 10 which are filled with ferromagnetic material and connected via a heat exchanger duct 13 therefore form a pair, the partners of which are alternately magnetized and demagnetized, whereby one partner is always magnetized and the other partner demagnetized.

It is an advantage that the seals 17 are always located in the high-temperature region of the working gas, i.e., on the one hand, prior to cooling of the gas in the demagnetized ferromagnetic material and, on the other hand, following heating of the working gas by the magnetized ferromagnetic material. No seals are required in the central cold region of the rotor.

The embodiment illustrated in FIG. 3 is essentially constructed in the same way as that of FIGS. 1 and 2 and the same parts therefore have the same reference numerals. It differs from the arrangement of FIG. 2 in that the rotor has a total of eight chambers 10 distributed uniformly around its circumference, two adjacent chambers being connected each time with one another via a heat exchanger duct 13. Consequently, four supply conduits 15 offset relative to one another through 90° and four outlet conduits 16, also offset relative to one another through 90°, are provided as well as four coils 23 and 24, again offset relative to one another through 90°. By multiplying the number of ferromagnetic members 11 and also the number of magnetic fields around the circumference, each pair is subjected to magnetic cooling eight times during one rotation of the rotor. This means that, during one rotation, refrigeration capacity can be passed to the refrigeration medium from each heat exchanger duct 13 a total of eight times. This means that the operation is very uniform, i.e. a quasi-continuous cooling of the refrigeration medium is achieved.

This multiplication of the number of magnetic members 11 around the circumference could be continued correspondingly. In each case, the advantage remains that the seals on the outer side of the rotor are located in the warm region and no seals are required in the cold region.

What is claimed is :

1. An apparatus for magnetocaloric refrigeration, comprising a ferromagnetic material arranged in a rotor and alternately entering and exiting from a stationary magnetic field when the rotor rotates, and also comprising a circuit for a working gas coming into successive heat exchange contact with a ferromagnetic material arranged outside the magnetic field and thereby cooled, a refrigeration load, a ferromagnetic material located within the magnetic field and thereby heated as well as an external negative heat source, characterized in that discrete members (11) consisting of ferromagnetic material are arranged around the rotor circumference so as to be angularly offset, that two members (11) are connected each time to form a pair by a flow path (heat exchanger duct 13) for the working gas, said flow path being arranged within the rotor (5) and leading from an outer surface (18) of the rotor (5) via heat contact with one member (11) of said pair into the center of the rotor (5) and then via heat contact with the other member (11) of said pair to an outer surface (18) of the rotor (5) again, that at least one stationary supply conduit (15) ending in a sealed manner at the outer surface (18) of the rotor (5) and one stationary outlet conduit (16) beginning in a sealed manner at the outer surface (18) of the rotor (5) are provided for the working gas, both conduits communicating with the flow path of one pair in a predetermined angular position of the rotor (5), that each outlet conduit (16) is associated with a stationary magnetic field such that the member (11) adjacent the outlet conduit (16) is located within this stationary magnetic field and the other member (11) of the pair outside the magnetic field in said predetermined angular position, and that a cooling conduit is guided through a hollow bearing shaft (6) of the rotor (5) and has a refrigeration medium flowing through it, said refrigeration medium acting as refrigeration load and coming into heat contact with the working gas in the center of the rotor (5).

2. Apparatus as defined in claim 1, characterized in that with one pair the beginning and end of the flow path form a circumferential angle of 360/2n degrees, wherein n is a whole number, that n supply conduits (15) and n outlet conduits (16) are uniformly distributed around the circumference, supply conduits (15) and outlet conduits (16) hereby alternating, and that each outlet conduit (16) is associated with a stationary magnetic field and the member (11) disposed upstream of the respective outlet conduit (16) is located within said magnetic field.

3. Apparatus as defined in claim 2, characterized in that a plurality of supply conduits (15) and outlet conduits (16) are connected in parallel with one another and communicate with an external negative heat source (20).

4. Apparatus as defined in claims 2 or 3, characterized in that the rotor (5) has up to n pairs distributed around the circumference of the rotor (5) such that the flow paths of all the pairs communicate simultaneously with supply and outlet conduits (15 and 16, respectively).

5. Apparatus as defined in claim 1, characterized in that the members (11) consist of porous ferromagnetic material and fill the cross section of the flow path so that the working gas passes through the porous ferromagnetic material.

6. Apparatus as defined in claim 5, characterized in that the members (11) of ferromagnetic material are arranged in rotor chambers (10) and the flow path passes therethrough, and that a heat exchanger duct (13) is disposed between the chambers (10) accommodating the two members (11), said heat exchanger duct connecting said chambers and leading through the hollow bearing shaft (6) of the rotor (5).

7. Apparatus as defined in claim 6, characterized in that the heat exchanger duct (13) has the shape of a helix.

8. Apparatus as defined in claim 1, characterized in that the supply and outlet conduits (15 and 16, respectively) are encircled by stationary seals (17) abutting sealingly against the outer surface (18) of the rotor (5).

* * * * *